(12) United States Patent
Holsinger et al.

(10) Patent No.: US 11,431,723 B2
(45) Date of Patent: Aug. 30, 2022

(54) SYSTEM AND METHOD FOR CONTROLLING ACCESS TO DATA ASSOCIATED WITH A VENUE-CENTRIC EVENT

(71) Applicant: Freeman Holding, LLC, Dallas, TX (US)

(72) Inventors: Kenneth D. Holsinger, Eagle Point, ID (US); Evanson G. Baiya, Meridian, ID (US); Casey R. McMullen, Eagle, ID (US)

(73) Assignee: Freeman Holding, LLC, Dallas, TX (US)

( * ) Notice: Subject to any disclaimer, the term of this patent is extended or adjusted under 35 U.S.C. 154(b) by 221 days.

(21) Appl. No.: 16/054,070

(22) Filed: Aug. 3, 2018

(65) Prior Publication Data

US 2019/0044953 A1  Feb. 7, 2019

Related U.S. Application Data

(60) Provisional application No. 62/540,875, filed on Aug. 3, 2017.

(51) Int. Cl.
*H04L 9/40* (2022.01)
*H04W 4/021* (2018.01)
(Continued)

(52) U.S. Cl.
CPC ........ *H04L 63/108* (2013.01); *G06F 21/6218* (2013.01); *H04L 63/0428* (2013.01)

(58) Field of Classification Search
CPC ............... H04L 63/108; H04L 63/0428; G06F 21/6218
See application file for complete search history.

(56) References Cited

U.S. PATENT DOCUMENTS

2008/0306826 A1  12/2008  Kramer et al.
2010/0228602 A1*  9/2010  Gilvar ............... G06Q 30/0252
                                                                705/14.5
(Continued)

FOREIGN PATENT DOCUMENTS

EP  2693778 A1  2/2014

OTHER PUBLICATIONS

International Search Report and Written Opinion in corresponding International Patent Application No. PCT/US2018/045233, dated Nov. 15, 2018.

(Continued)

*Primary Examiner* — Fatoumata Traore
*Assistant Examiner* — Hamid Talaminaei
(74) *Attorney, Agent, or Firm* — Julie L. Langdon; Vedder Price P.C.

(57) ABSTRACT

A system configured controls access to data associated with a venue-centric event. The system may include one or more hardware processors configured by machine-readable instructions. The processor(s) may be configured to receive from a first remote server a set of first data items associated with a first authenticated event application and store the set of first data on the local appliance. Second data items are received from a second remote server, at least some of the second data items are different from the first data items and thereby form a set of third data items. A request for at least one of the second data items is received from the first authenticated event application and validated. The request may be received after the predetermined start time and before the predetermined end time. The requested at least one second data item is communicated to the first authenticated event application.

20 Claims, 6 Drawing Sheets

(51) Int. Cl.
*H04W 4/024* (2018.01)
*G06F 21/62* (2013.01)

(56) References Cited

U.S. PATENT DOCUMENTS

| | | | |
|---|---|---|---|
| 2011/0106896 A1 | 5/2011 | Baransky et al. | |
| 2012/0308035 A1 | 12/2012 | Ginn et al. | |
| 2013/0254401 A1* | 9/2013 | Marshall | G06F 21/6218 709/226 |
| 2014/0343994 A1* | 11/2014 | Graff | G06Q 10/1095 705/7.19 |
| 2014/0358632 A1 | 12/2014 | Graff | |
| 2016/0021159 A1* | 1/2016 | Gritsch | G06Q 10/10 709/204 |
| 2016/0192130 A1* | 6/2016 | Kahn | H04W 4/021 455/456.3 |
| 2018/0211554 A1* | 7/2018 | Corbin, II | G06K 9/6224 |
| 2020/0244297 A1* | 7/2020 | Zalewski | H04W 76/10 |

OTHER PUBLICATIONS

Extended European Search Report in corresponding European Patent Application No. 18841685.3, dated Mar. 12, 2021.

\* cited by examiner

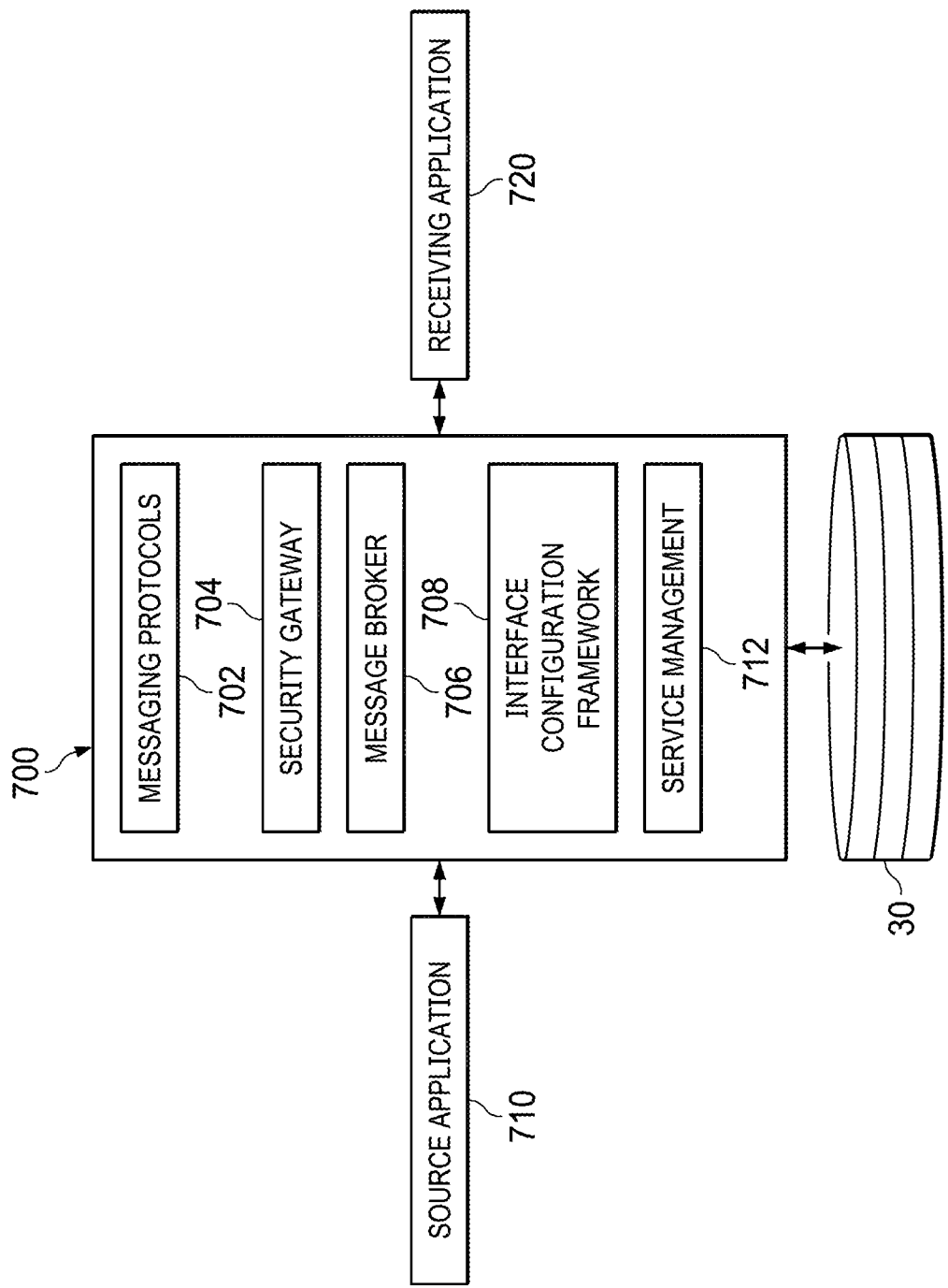

SYSTEM AND METHOD FOR CONTROLLING ACCESS TO DATA ASSOCIATED WITH A VENUE-CENTRIC EVENT

CROSS REFERENCE TO RELATED APPLICATIONS

This application claims the benefit of and priority to U.S. Provisional Patent Application No. 62/540,875, filed on Aug. 3, 2017, and is incorporated herein by reference in its entirety.

FIELD OF INVENTION

The disclosure herein pertains generally to the field of events and more specifically to technology, processes, and methodology of capturing, exchanging, storing, transmitting, transforming, and analyzing data associated with physical and virtual applications and devices.

BACKGROUND

In a typical venue-centric event, there are many concurrent interactions between people (attendees), technologies, and space (both physical and virtual). Data is created through many of these interactions. With the proliferation of digital devices among event attendees and the event space, the quantity and quality of digital signals, which can be captured as data, is growing at exponential scale. Stand-alone software and physical applications are using this data to create, improve, and transform the event, the event experience, attendee workflows, and much more. A venue-centric event includes, but is not limited to marketing meetings, expositions, tradeshows, corporate get-togethers, conventions, meetings, exhibit programs, entertainment gatherings, institutional festivals, and promotional rallies.

There has been significant growth in the number of software applications and devices now being used in event environments. The technologies handle many activities such as event planning, attendee registration, event promotion, hotel bookings, travel bookings, selection and allocation of exhibition spaces, among others. These technologies are enabling improvement in attendee engagement, provide personalized experiences, have become great source of data that is used for event management, administration, marketing, and operational efficiencies.

Specifically, mobile applications (apps), sensor integration, wearable technologies, augmented and virtual reality, social media, drones, robots, 3-D printing, and tracking technologies have many uses in the events context. For example, for the event attendee, mobile technologies can be used to hold static information such as agendas, event venue maps, and answers to general frequently asked questions. The mobile technologies can also be used to generate and encourage attendee engagement with the various activities going on at the event such as voting, submitting questions to speakers, participating in live competitions, and finding potential collaborators and social groups inside and outside the event venue.

For the event architects and planners, venue-centric event mobile technologies provide opportunities to communicate with attendees by using notifications, alerts, smart push messages and more. They also can be used to collect real-time feedback through polling, surveys, instant messaging, and connection with audiences outside the venue.

Each application and device may produce its own data and captures specific data from specific function(s) in the event workflow for its own utilization. Devices are typically capturing data which are forwarded to the application's database for analysis and utilization. Event attendees are also producing data either through their own devices or their physical elements that could be captured digitally.

With the explosion of data being captured, the number of applications and devices, there is a problem of data interconnectivity and sharing between applications, particularly across separate physical devices. Devices and applications typically do not interact seamlessly, therefore resulting in discrete data silos stored and managed by each data source. There is not a standard format, storage or exchange of event-generated data, regardless of the application or device used, which makes each data source distinct. As a result, event data is distributed among many sources, it is not stored in single place to be consumed or shared among different applications, and discrete applications cannot exchange data using any data standard(s).

SUMMARY

One aspect of the present disclosure relates to a system configured for controlling and facilitating access to data associated with a venue-centric event. The system may include one or more hardware processors configured by machine-readable instructions. The processor(s) may be configured to receive from a first remote server a set of first data items associated with a first authenticated event application and store the set of first data on local storage. During an event, local storage will be installed and managed by the data access control system. The set of first data items is subject to restricted access. Second data items are received from a second remote server. The set of second data items may be associated with a second authenticated event application and the set of second data items are stored on the local storage. The set of second data items are subject to restricted access. A request for at least one of the second data items is received from the first authenticated event application and validated. The request may be received after the predetermined start time and before the predetermined end time. The requested at least one second data item is communicated to the first authenticated event application.

Another aspect of the present disclosure relates to a method for controlling access to data associated with a venue-centric event. Yet another aspect of the present disclosure relates to a non-transient computer-readable storage medium having instructions embodied thereon, the instructions being executable by one or more processors to perform a method for controlling access to data associated with a venue-centric event.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

FIG. 5 is a schematic illustration of a data service bus architecture associated with the venue-centric data access control system, according to some embodiments.

DETAILED DESCRIPTION

Figure 1A:
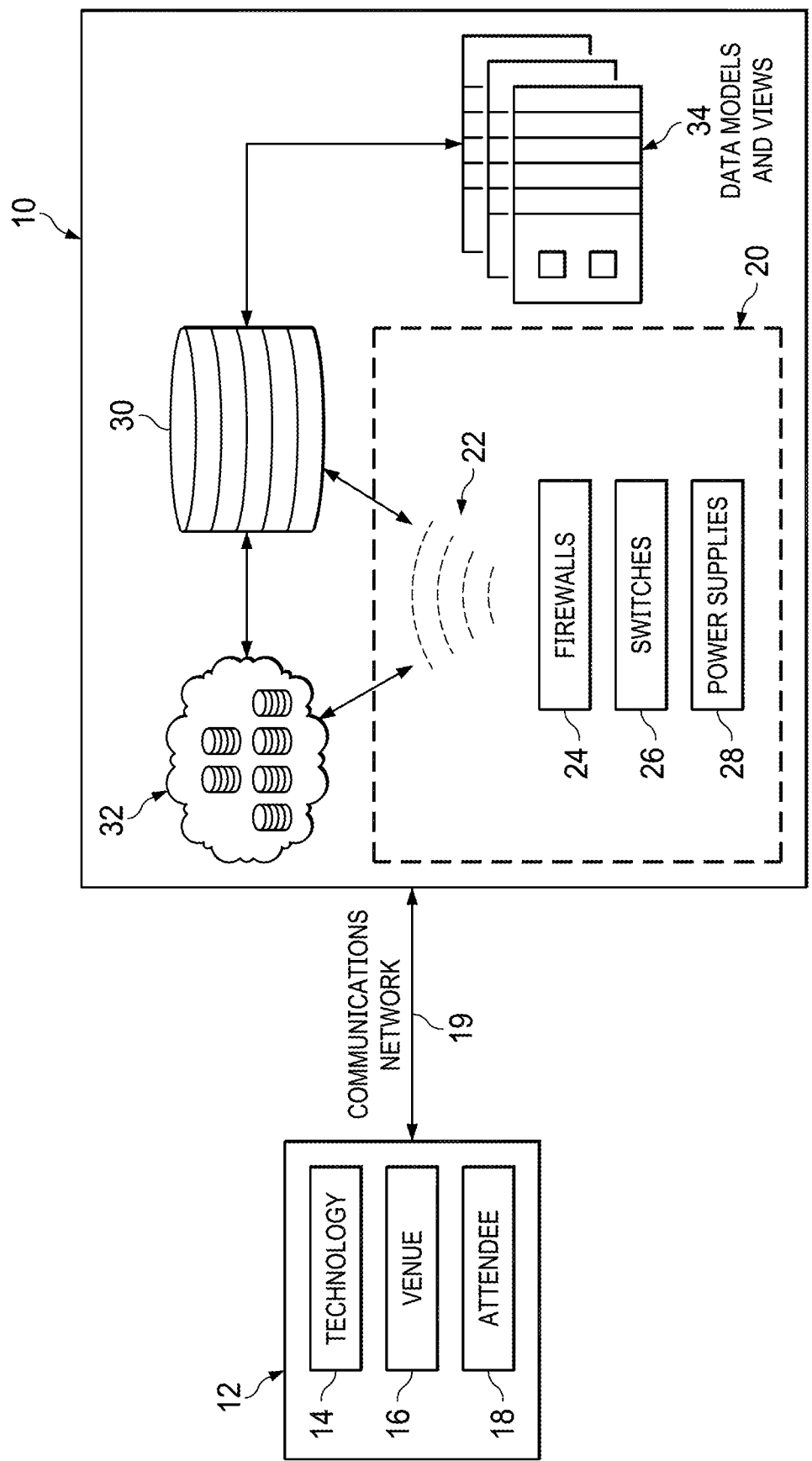
FIG. 1A is a schematic illustration of a venue-centric data access control system, according to some embodiments.

With reference to FIG. 1A, the present disclosure provides one or more physical appliances that embodies a data access control system 10 that is operable to control access to data associated with a venue-centric event. The captured data can be stored, transmitted, analyzed, and made available securely and confidentially between hardware and/or software applications and devices associated with a venue-centric event. Security and confidentiality is maintained by allowing communication with the system through authenticated data sources and only authenticated external systems are allowed to access the data captured by the system. In addition, the system supports data encryption and decryption in multiple different encryption formats. Data may be stored remotely before and during an event. Data is also stored locally during an event. For purposes of this invention, local storage means storage within physical proximity to the event venue, normally added for the even and removed afterward.

The data access control system 10 is operable to communicate with remote servers prior to and in preparation for a venue-centric event. The remote servers are expected to be operated by venue-centric software/application providers whose software/application service is marketed to be used at a venue-centric event, such as an industry trade show held at a convention center or other building campus or complex. Prior to the event, the data access control system 10 and one or more servers associated with the system may be located virtually anywhere. During this period, it is expected that the communications between the system 10 and the remote servers of the software/application providers will be the type of data traffic typically associated with a commercial business on a daily basis.

During the period of the event, it is expected that event organizers, event attendees, vendors, presenters, hospitality providers, and the venue-centric software application providers will access the venue-centric data access control system 10 frequently over a short period of time. More specifically, a short period of time that begins with physical set up and ends with the tear-down of the venue-centric event. With many users accessing the system 10 very frequently over a short period of time, the system 10 efficiently manages such traffic in part because it can be operated, at least in part, within close proximity to or at the venue. In addition, the system 10 provides a network as a service to those participating in the event at the venue. In this manner, those participating in the event will enjoy reliable access to a public data communication network, such as the Internet, that might otherwise be slow and frustrating if the event participators were required to access the Internet conventionally.

According to an example embodiment, a software/mobile application ("show software") provider intends to provide its software service/product to attendees of an annual International Conference of the American Thoracic Society occurring over a one-week period in Dallas, Tex. in 2019. The show software is a mobile application that assists the Society with floor plan set-up and modification, booth sales, and a virtual floor plan/map. Months prior to the event the show software registers with the data access control system, as described in more detail below, and becomes authenticated. During the months preceding the conference, the authenticated show software provides data from its remote servers to the data access control system 10. The system 10 receives and stores such data. When the event occurs, the show software accesses such data from the system 10 more efficiently that it would if it were to be required to only communicate with its own remote servers. In addition, the show software may also benefit because it may access the data that was previously provided by a different show software provider, whose server was authenticated and also provided data to the system 10 over the months leading up to the venue-centric event. The data of multiple show software providers is saved by the system and can be analyzed to optimize current or future events.

The system 10 hosts data storage, data exchange, security and management applications, event-related data, and enables networking between devices and other data sources. Data associated with a venue-centric event 12 can be categorized by the aspect of the event to which the data is associated. For example, in a typical venue-centric event, a first data source is a technology data source 14. The technology data source is generally associated with third-party software or mobile application services. Such services may be associated with different aspects of a venue-centric event, such as venue maps, event agendas, attendee registration, audio-visual services for event vendors or presenters, and the like.

A second data source may be a venue data source 16. The venue data source 16 includes data captured using sensors and other devices that are positioned about the venue. For example, a data sensor or set of sensors may be track movement of event attendees in order to provide information that allows event organizers or others to track the flow of attendees at certain times of the venue-centric event or attendee movement associated with certain vendors or audio-visual presentations or other advertising or sponsorship displays. If the venue-centric event is an annual event, analysis of such data may help event organizers optimize placement of vendors, sponsors, presenters, and the like at subsequent events.

Figure 1B:
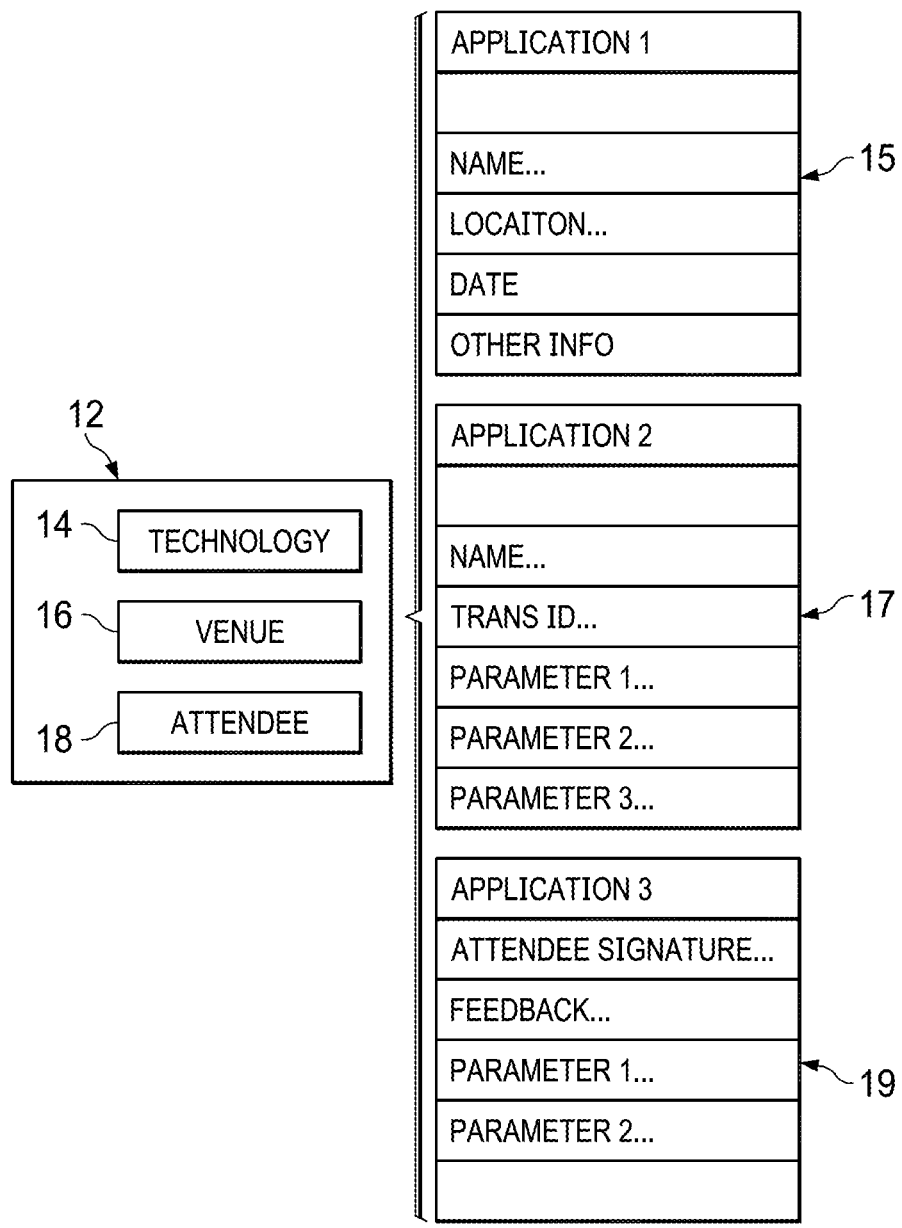
FIG. 1B is a schematic illustration of various data sources that may supply data and/or request data from the venue-centric data access control system, according to some embodiments.

A third type of data source is an attendee data source 18. Data categorized as received from an event attendee data source 18 includes data captured by sensors or mobile devices that are generally located on the person of an attendee. According to one embodiment, a badge may be issued to an attendee at registration for a three-day event. The badge may include a sensor or microsensor, such as an RFID sensor, that is detected by receivers positioned throughout the venue. According to an alternate embodiment, the receivers may track an attendee's personal mobile communication device, such as his or her personal smartphone, laptop, tablet, and the like. The data access control system 10 captures and stores data from multiple data sources, such as the technology data source 14, the venue data source 16, and the attendee data source 18 and makes some or all of such data available to authenticated users for data analysis or other purposes as set forth in more detail below. The present disclosure contemplates other data sources that may communicate data to the data access control system 10. FIG. 1B is a schematic illustration of a technology data set 15 provided by the technology data source 14, a venue data set 17 provided by the venue data source 16, and an attendee data set 19 provided by the attendee data sources 18.

Each of the data sources may communicate or otherwise provide data to the system 10 in a specific format associated with the particular data capture or data generation technology employed. The data access control system 10 is operable to receive and store data in multiple formats. According to one embodiment, data is received in a first format, and can be subsequently translated into a second format, and the translated data can be communicated to a data receiver that is configured to receive the data in the translated format.

The received data from the venue-centric event data sources 12 may be encrypted, such that only authenticated users may access and share the stored data. Preferably, all data is encrypted during transit and in storage. Each application and device can be configured to be both a source (i.e. provider) and a receiver of authorized data through the system 10. For example, an electronic message, such as an email or text message may be converted into a protected form before transmission over the network. Encryption and decryption relies on receipt of a predetermined key to either convert a message into an encrypted message or decrypt a message that had previously been encrypted.

Digital data is received by the data access control system 10 from the data sources 12 through one or more communication networks 19, for example the Internet, local WiFi, Bluetooth, or other means. The data access control system 10 stores the data and is operable to communicate the stored data to a data receiving application, which may or may not be the application from which the data was originally provided to the system 10. According to an embodiment, as described in more detail below, a requesting venue-centric event application receives data from the system 10 that was supplied by a separate and distinct venue-centric event application. Communication is maintained secure and only for authorized data sources according to the encryption keys and other secure data transmission methods disclosed herein.

To access data maintained by the data access control system 10, each application must be authorized to submit a data transmission order or request. Each authorized application will be granted specific access to data, thus maintaining confidentiality.

The data access control system 10 may include local and remote components. A server 20 may include the electronic capabilities that are known in the art for securely receiving, storing, and communicating digital data. For example, the server 20 may include communication functionality 22 that is known in the art, such as wireless communication functionality, Wi-Fi, Bluetooth, Ethernet, Local Area Network, high speed, and the like. The communication functionality 22 allows the system 10 to communicate over the Internet and/or a local communications network. The server 20 also includes one or more firewalls 24, switches 26, and power supplies 28 to enable secure data communication, data storage, and data processing.

An exemplary server 20, or multiple servers, and other computer/communications devices disclosed may include communication lines, or ports to enable the exchange of information with a network and/or other computing platforms. The server(s) 20 may include a plurality of hardware, software, and/or firmware components operating together to provide the functionality attributed herein to server(s) 20. For example, server(s) 20 may be implemented by a cloud of computing platforms operating together as server(s) 20.

Electronic local data storage 30 may comprise non-transitory storage media that electronically stores information. The electronic storage media of electronic storage 30 may include one or both of system storage that is provided integrally (i.e., substantially non-removable) with server(s) 20 and/or removable storage that is removably connectable to server(s) 20 via, for example, a port (e.g., a USB port, a firewire port, etc.) or a drive (e.g., a disk drive, etc.).

Local electronic data storage 30 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The stored data is viewable through an interface operable to display data models and views 34 that are configured to be manipulated by a user.

The server 20 is operable to communicate with one or more virtual storage resources 32 (e.g., cloud storage, a virtual private network, and/or other virtual storage resources). Either local storage 30 or virtual storage 32 may store software algorithms, information determined by processor(s), information received from server(s) 20, information received from other computing platform(s), such as data sources 12, and/or other information that enables server(s) 20 to function as described herein.

On or more processors may be configured to provide information processing capabilities in server(s) 20. As such, processor(s) may include one or more of a digital processor, an analog processor, digital circuits designed to process information, an analog circuit designed to process information, a state machine, and/or other mechanisms for electronically processing information. In some implementations, processor(s) may include a plurality of processing units. These processing units may be physically located within the same device, or processor(s) may represent processing functionality of a plurality of devices operating in coordination.

The processor(s) may be configured to execute the modules and/or the functionality described herein. The processor(s) may be configured to execute such modules by software, hardware, firmware, some combination of software, hardware, and/or firmware, and/or other mechanisms for configuring processing capabilities on processor(s). As used herein, the term "module" may refer to any component or set of components that perform the functionality attributed to the module. This may include one or more physical processors during execution of processor readable instructions, the processor readable instructions, circuitry, hardware, storage media, or any other components. It should be appreciated that modules may be implemented within a single processing unit, in implementations in which processor(s) includes multiple processing units, one or more of the modules described herein may be implemented remotely from the other modules. The description of the functionality provided by the different modules described in this disclosure is for illustrative purposes, and is not intended to be limiting, as any of the disclosed modules may provide more or less functionality than is described. For example, one or more of the disclosed modules may be eliminated, and some or all of the eliminated module's functionality may be provided by other ones of modules. As another example, the processor(s) may be configured to execute one or more additional modules that may perform some or all of the functionality attributed below to one of modules.

Figure 2:
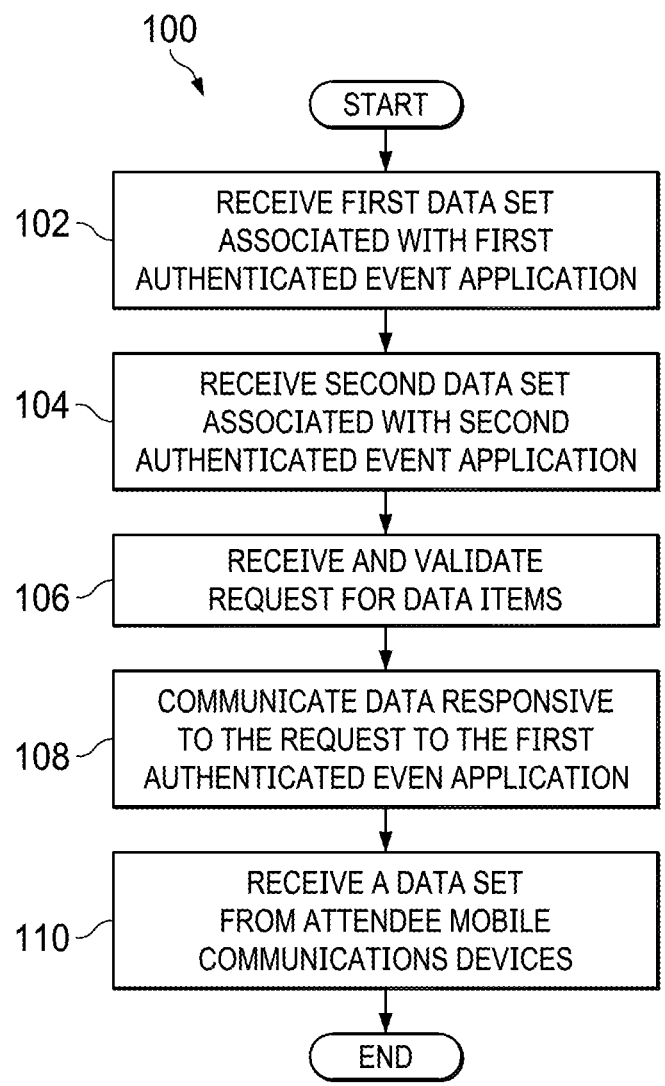
FIG. 2 is a flow diagram of a method of controlling access to venue-centric event data according to, according to some embodiments.

Reference is made to FIG. 2, which is a flow-diagram of a method 100 of controlling access to data associated with a venue-centric event. The method may be performed by the data access control system 10, and more specifically by the server 20 including the processor, communication functionality, and digital memory, such as local data storage 30, associated with the server 20. The server 20 executes a data access control application. The server 20 may also be referred to as a local appliance that is configured to store data and communicate with a communications network, such as the Internet. The server 20 may be located at the venue where the venue-centric event is held, or it may be located remotely, but generally geographically close to the venue, such that communication to devices located at the venue is generally fast, such that the receiving the data from the data access control system are not frustrated by an extended period of time to fully receive the data. The data may be accessed between a predetermined start time and a predetermined end time. According to some embodiments, the predetermined start time is a time associated with the set-up or start time of a venue-centric event. The predetermined start time may be weeks or months prior to the arrival of attendees that typically marks the start of event. There are many set-up activities associated with the set-up and planning of a venue-centric event that allow a venue-centric event to run smoothly and efficiently.

At step 102, a first set of data items associated with a first authenticated event application is received from a first remote server. FIG. 1B shows an example of data sets that might be communicated from a remote server to the event data access control system 10. A first data set may include data communicated from a technology data source 14, such as a venue-centric software service. The software service requires certain data, such as a name, location address, date range, and the like. The venue centric software service may be associated with audio-visual presentation software for event vendors. The first set of data is stored in the local data storage 30 for easy access by the server 20. The first data set is subject to restricted access.

According to one embodiment, the first venue-centric software service registers with the system 10, such that it is recognized as an authenticated data source. Such authentication may allow the first venue-centric software service access to only the data it provides initially. As explained in further detail below, the first venue-centric software service may send the system 10 a request to access data that was not originally provided by the first venue-centric software service. Such request is recognized by the system 10 as an authorized request because it includes an Application Programming Interface (API) key that was previously generated by the system 10.

At step 104, a second set of data items associated with a second authenticated event application is received from a second remote server. FIG. 1B shows an example of a second set of data items that is associated with a second venue-centric software services. According to one embodiment, the second set of data items includes a name of an event vendor, an identification number associated with such vendor, and category of presented products or services associated with the vendor. The second set of data items is stored in local data storage 30, and in local data storage 30, the second set of data items is subject to restricted access.

The second set of data items includes data items that are different from the first set of data items. Thus, the local data storage 30 includes a third set of data items, which are data items included in the second set, but not included in the first set. The third set of data items is accessible by the first authenticated event application upon receipt by the system 10 of an authenticated request. In this manner, separate event-centric software services may securely share data.

At step 106, the data access control system 10 receives and validates a request for at least one of the third data items. The request is communicated to the system 10 by the first authenticated event application, and the request is received by the data access control system 10 after the predetermined start time and before the predetermined end time. According to certain embodiments, the request may originate at a mobile communication device of an attendee. Such mobile communication device may be running a mobile application provided by the first event-centric software service. The request is communicated to the first venue-centric software service, and is then communicated to the system 10, which recognizes the request as coming from an authenticated source. Alternatively, the request may be communicated directly from the mobile communication device associated with the event attendee to the system 10. In either instance, the request for the third data item is received and validated by the data access control system 10.

At step 108, the data responsive to the request is communicated by the data access control system 10 to the first authenticated event application. According to one embodiment, the responsive data is encrypted in order to be securely transmitted from the system 10 to the first authenticated event application.

At step 110, the system 10 may optionally receive a fourth data set from a plurality of mobile communications devices associated with a plurality of attendees of the venue-centric event. The fourth data is shown in FIG. 1B as data items generated by the attendee data source 18. The fourth data may be associated with the registration of the attendees. Thus registration information may be provided to either the first or second authenticated event application software services regardless of whether the attendee preregistered with the particular authenticated software service.

The communicated first, second, third, or fourth data items may be any of multiple formats that are understood and can be translate by the system 10.

The data access control system 10 ensures working connection between applications by providing the network as well as providing the interfaces and intelligence to enable communication between the data access control system 10 and authorized applications. Advantageously, the secure system preserves transaction confidentiality while allowing multiple applications to easily respond to relevant requests without guessing what data belongs to them—each request is uniquely identified and can be consumed only by the intended application.

The data access control system 10 receives or transmits encrypted (a) application information, (b) user data, and (c) any requests, through its interfaces. The application interfaces can be used by any validated application or device to share and receive any data from the appliance. Preferably, all data is encrypted during transit and in storage conditions. Each application and device can be configured to be both a source and a consumer of authorized data through the appliance. Each API call i.e. data is usually converted into a protected form before transmission over the network. The process of converting information into a protected form is called "encryption" and a converted message is called an "encrypted" message. Data is encrypted using 128-bit or 256-bit standards.

As stated above, data is communicated to and from authenticated sources. An application must be registered to communicate with the data access control system 10. Registration does not necessarily authorize the registered application to participate in a particular event. A registered application is operable to integrate the APIs provided by the system 10. After registration, a unique application identifier, for example, an alphanumeric code and a secret key are generated and communicated to the registered application. A particular registered application can be invited by the system 10 to participate in a particular venue-centric event.

To access data maintained by the data access control system 10, each application must be authorized to submit or accept a data transmission request. Each authorized application will be granted specific access to data, thus maintaining confidentiality. The data access control system 10 ensures seamless connection between applications by providing the network as well as providing the interfaces and intelligence to enable communication between the data access control system 10 and authorized applications. Advantageously, the secure system preserves transaction confidentiality while allowing multiple applications to easily access relevant requests without guessing what data belongs to them—each request is uniquely identified and can be consumed only by the intended application.

To participate in a particular event, a registered application must also be authorized. The authorization process includes creation by the system 10 of an event identifier (eventid) associated with a particular event, such as the 2019 International Builders Show. Then an event key (secured key that includes the eventid and applicationid) is generated by the system 10, which registered and authenticate applications use to share or receive data through the data access control system 10 for that specific event. An invitation email or other electronic communication with the key is sent to applications that have been preselected to participate in the event. The application owner is expected to open the secured key to validate application and upon validation, the application is authorized to accept and share data for that event. In the event an unauthorized application attempts to communicate or request data from the system 10, the unauthorized application does not communicate the secure key, and the system 10 does not permit the unauthorized application to transmit or share data associated with the particular event. However, the registered application may be invited to participate in a different event, such as the case the 2020 National Automobile Dealers Association trade show.

One or more instruction modules include machine-readable instructions to carry out certain functionality of the data access control system 10. For example, the data access control system 10 includes a request manager module. The request manager module creates a secure request for a transaction. In particular, the request manager module instantiates a request object, which stores request information and optionally, additional information such as location information and timing information.

Upon obtaining information about a selected request, the request manager module creates a transaction packet for the request. Preferably, the transaction packet contains (a) application information, (b) user data, and (c) request description. Application information includes an application ID and an API key. User data includes any identifiable data associated with the user including data associated with the geographic location of the user. Request description information is specific data or a response that the user is asking for or responding to.

A data service module may contain several component modules including an encryption/decryption module, an intelligence module, and a bindery module. In addition, the data service module includes one or more databases, which may organize the data stored on the local data storage 30 and/or the virtual data storage 32. The databases can host any form of data, structured or non-structured.

Figure 3:
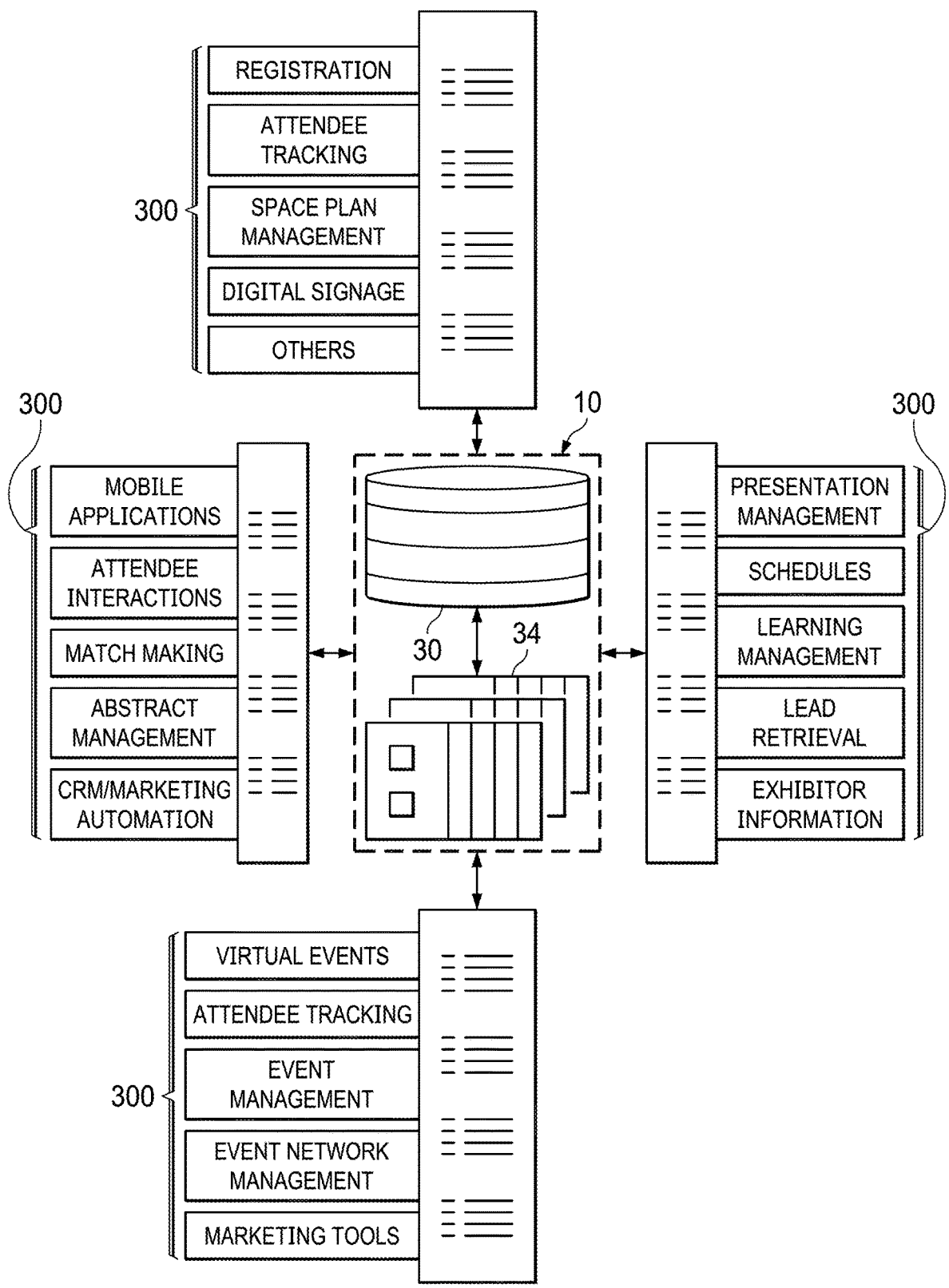
FIG. 3 is a schematic illustration of various data types stored in connection with a database accessible by the venue-centric event data access control system.

A schematic of exemplary data in a database according to the teachings of the present disclosure is shown in FIG. 3. The data may be stored in the local data storage 30 of the venue-centric data access control system 10. Users may interact with the data by viewing and manipulating the data models and views 34. FIG. 3 illustrates a variety of data types 300 that may be received, stored, and transmitted by the system 10. The data types 300 are those expected to be associated with a venue-centric event, such as registration, attendee tracking, space plan management, presentation management, schedules, lead retrieval, exhibitor information, and the like. The present disclosure is not limited to any particular data types, but rather contemplates any data type that might be associated with a venue-centric event.

An intelligence module hosts rules and conditions for data transmission. Rules can be created statically or dynamically on how, who, and when the data is shared, formatted, transmitted, and interlinked. Interlinking of data allows self-interpretation of data between applications especially where a single parameter has multiple names or identifiers.

A bindery module registers venue-centric applications, for example an audio-visual presentation application, an event agenda application, an event floor plan application, an event vendor equipment application, and the like. The venue-centric applications register with the bindery module before they can submit data or submit requests to receive sharable data securely. Encryption keys are authenticated and copies of the encryption keys are stored in the database. In other embodiments, the applications can, in a similar manner, also register their publicly accessible encryption keys with the data service.

Figure 4:
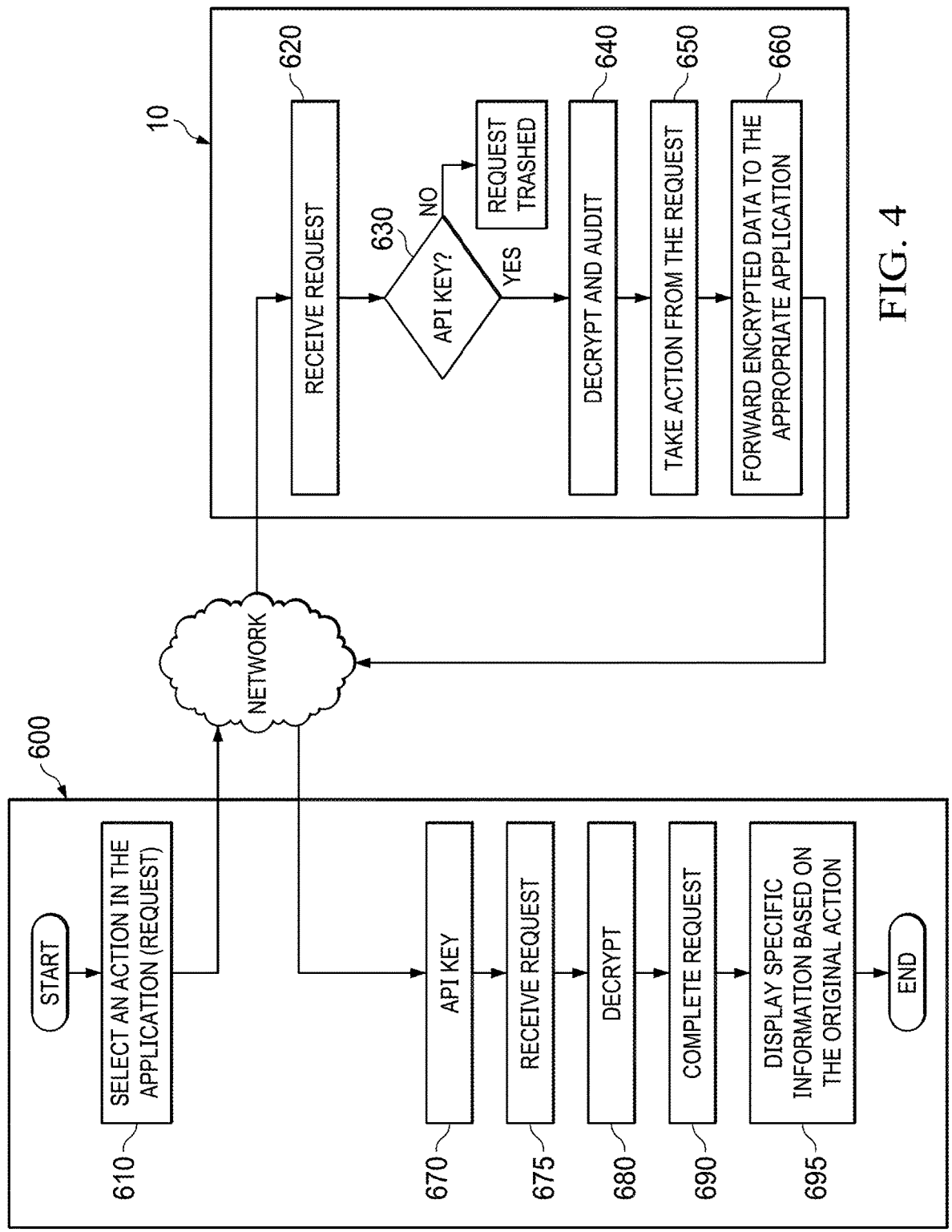
FIG. 4 is a flow diagram of an authenticated application requesting data from the venue-centric data access control system.

FIG. 4 is a flow diagram of an authenticated venue-centric event application 600 requesting data from the data access control system 10. The application 10 may be responding to input made by a user interacting with a mobile application or website operated by the service provider. The user may be using a keyboard (or virtual keyboard) on a personal communications device, such as a smartphone, tablet, laptop computer, and the like. At step 610, the user directs the venue-centric event application 600 to request specific data. The venue-centric event application 600 recognizes that it must request such data from the data access control system 10.

The venue-centric event application 600 communicates through a network, such as the Internet or local network, with the data access control system, which receives the request for specific data at step 620. The data access control system determines if the request includes the appropriate API key at step 630, such that the data access control system 10 recognizes the request as coming from an authenticated application. If the request does not include the recognized API key, the request is trashed. If the request, does include the appropriate API key, the process proceeds to step 640, and the authenticated request is decrypted and evaluated (format, ordered, etc.). Example machine-executable code for the request confirmation step 630 is shown below:

```
const crypto = require("crypto");
//0. Secret key.
const secretKey = "mySecretKey";
//1. Create signature parts
const host = "fuzionapi.com";
const path = "/v1/attendees";
const method = "GET";
//2. Header values
const requestTimestamp = new Date( ).valueOf( );
const fuzionAppKey = "myPartnerAppKey";
const signatureParts =
'${host}${path}|${method}|${requestTimestamp}|${fuzionAppKeyId}';
//3. Create signature using signatureParts and secretKey
let partnerAppSignature = crypto.createHmac("sha256", secretKey)
update(signtureParts)
digest("base64");
```

Based on the request, the data access control system 10 takes the directed action. The directed action may be searching and retrieving a data item from a database, such as the database schematically illustrated in FIG. 3. The data item may have originally been supplied to the database by a separate authenticated venue-centric event application or the data item may have been supplied from the venue source 16, or the data item may have been provided directly by an attendee using a mobile communications device. At step 660, the requested data is encrypted and sent through the network 615 to the venue-centric event application 600. The requested data is encrypted to maintain its security while being transmitted over a public network.

At step 670, the venue-centric event application 600 confirms the request includes the API key and receives the requested data at step 675. The requested data is decrypted by the venue-centric event application 600 at step 680, and the request is complete 690. The requested data received from the data access control system can be displayed to the user in the context of the venue-centric event application 600 at step 695.

With reference to FIG. 5, the secured communication module 700 (also referred to as a data service bus) hosts and controls the communication and routing of data and requests for data among a first venue-centric event application that acts a source application 710 and a second venue-centric event application that acts as a consuming or data receiving application 605, and the data access control system 10, which includes the data service bus 700 and the local data storage 30 (or alternatively, the remote data storage device 32). FIG. 5 schematically illustrates architecture associated with the data service bus 700. The architecture includes messaging protocols 702, a security gateway 704, a message broker 706, an interface configuration framework 708, and service management 712.

The secured communication module 700 may also include an authentication module that hosts and controls application access to data—each application has an identifier (digital signature) that must be verified to access or to store data from the system. The authentication module also validates the request.

The interface configuration framework 708 hosts libraries of application interfaces and services of which applications use to communicate with the system. This is the conduit by which the data service uses during execution of requests. The interface libraries are composed of dynamic and static linking methodologies that can transmit different types of requests including files, individual data elements, and even unknown formats such as unstructured data. Applications integrate to the data access control system 10 using any of these interfaces. However, the application is only required to select those interfaces that are related to the type of requests they are likely to generate or data services (data elements and functions of the database, sometimes referred to as micro-services) to the specific application.

The data service bus 700 directs the traffic of data and messages, determines routing logic, and transforms the message for compatibility between source (producer) and destination (consumer) applications by using the format for the data and ensuring delivery of such data to the intended destination. The data service bus 700 provides message delivery services. The data service bus 700 provides high throughput and message delivery between applications and service producers and consumers. The data service bus 700 promotes agility, flexibility, and availability of data to the relevant applications making it possible for any application to be interoperable using known web-services and messaging protocols, JSON, SOAP, HTTP, JMS (Java messaging service), SMTP/IMAP/POP, FTP, File, and others.

The data service bus 700 also standardizes the way all applications communicate as that is the only way the data will be available to the application when requested from the system 10—the message is converted to the appropriate message type and protocol. All applications therefore have standards data interpretation protocols and translation methodologies. For example, the originating application format of the data may be in the JSON format, but the receiving application only receives data in REST or XML format. When the originating module places a request through the system 10, the data service bus 700 makes the data available in JSON and upon authentication and validation of the data, converts the data to the REST format so it is available to the receiving application. The data service bus 700 supports different communication types, synchronous and asynchronous. The data service bus 700 has centralized security—ensuring integrity and privacy of communications to ensure only authorized applications can access anything inside the data service bus domain. The security framework also provides authentication, authorization, credential mapping, auditing, and much more for both inbound and outbound message traffic.

The venue-centric event data access control system 10 also includes a data privacy compliance module that is enforces rules governing the handling of personal identifiable information (PII) by the data access control system 10. As such, source applications and consuming applications will meet local and international standards on data privacy such as General Data Protection Regulation ("GDPR").

Since each application has its own interface and a direct login for users, during an event, the different applications collect different types and formats of PII on the attendees. For instance application (a) may collect PII such as name, physical address, email address; application (b) may collect PII such as pictures, social media connections; and application (c) may collect PII such as phone number and tracking of movements during an application.

Any or all this information could be shared using the invention with other applications. For example, application (a)'s PII could be shared to three other applications (b), (d) and (k). If a user of application (a) asks for the PII data to be removed, the request is forwarded to the invention. The invention evaluates the request from (like it does for other data requests) and based on the rules, the invention may create a command to the other applications (b), (d), and (k) for them to delete the PII from application (a). A confirmation of the removal of the PII in the different applications is captured and compliance requirement is met.

In another instance, the user of application (a) may modify the way their PII is consumed in that application. They may for example restrict application (a) from sharing the PII with other applications. In that case where the data has already been shared, a request is created and the invention sends a command to the other applications to delete the data. The data privacy compliance module is composed of a user profile management engine (this is the one that is integrated via API) in each of the applications use to pass on user data, both PII and non-PII, through the invention.

Data analysis module is responsible of providing analytics and reports on the activities in the invention. For instance, basic reports on the number of exchanges, type of data exchanged and overall load performance of the invention. Such analytics may be used to continuously monitor the health of the system. According to certain embodiments, the system 10 is operable to analyze data requests and sharing among software service providers, mobile communication devices associated with attendees, venue-located sensors, and the like. The system may provide real-time information to allow the operators to improve and optimize the transmission and sharing of data by the system 10. In addition, the data analysis module may allow identification of a trend associated with a particular event.

According to an embodiment, the data access control system 10 may supply or interact with a portable network appliance that provides reliable bandwidth inside a venue. The portable network appliance may route communications from vendors, attendees, venue-centric application services, and the like have reliable access to a public network, such as the Internet.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method, comprising:
providing a portable data access control system to a venue for a venue-centric event, the portable data access control system having a portable local appliance and a portable network appliance, the portable local appliance having non-transitory storage media configured to store data, a processor, and communication functionality that allows the portable local appliance to communicate with the Internet and mobile communication devices associated with attendees of the venue-centric event via the portable network appliance; and
providing a data access control application for controlling access to data between a predetermined start time and a predetermined end time associated with the venue-centric event, the data access control application comprising computer-executable instructions stored in the non-transitory storage media of the portable local appliance that when executed by the processor of the portable local appliance perform steps comprising:
receiving from a first remote server, over the internet, an encrypted set of first data items associated with a first authenticated event application and storing the encrypted set of first data items in the non-transitory storage media on the portable local appliance, the set of first data items subject to restricted access, wherein the first set of data items includes data items associated with audio-visual presentation software;
receiving from a second remote server, over the internet, an encrypted set of second data items, at least some of the second data items comprising third data items, which are the data items from the encrypted set of second data items that are not included in the encrypted set of first data items, the set of second data items being associated with a second authenticated event application and storing the encrypted set of second data items in the non-transitory storage media on the portable local appliance, the set of second data items subject to restricted access, wherein the second set of data items include data items associated with a vendor of the venue-centric event;
establishing a local wireless network with the portable network appliance, the local wireless network configured to route communications inside the venue between the mobile communication devices associated with attendees and the portable local appliance;
receiving and validating a request for at least one of the second data items from the first authenticated event application, the request being received via the local wireless network after the predetermined start time and before the predetermined end time;
communicating the requested at least one second data item to the first authenticated event application via the local wireless network, wherein the at least one second data item is encrypted during communication;
wherein the executed machine-readable instructions perform the steps further comprising:
receiving via the local wireless network, fourth data items from mobile communications devices of a plurality of attendees of the venue-centric event and associated with registration information of the plurality of attendees; and
providing, via the local wireless network, the fourth data items to the first authenticated event application and the second authenticated event application.

2. The method of claim 1 wherein the executed computer-executable instructions perform steps further comprising encrypting the set of first data items and the set of second data items.

3. The method of claim 1 wherein the set of first data items are in a first format and the set of second data items are in a second format different from the first format.

4. The method of claim 3 wherein the first and second formats are each selected from the group consisting of: JSON, XML, REST, SMTP, and IMAP.

5. The method of claim 1 wherein the request for the at least one of the second data items from the first authenticated event application originates with a mobile communications device associated with an attendee of the venue-centric event.

6. The method of claim 1 wherein the portable local appliance provides Internet access to the mobile communications devices of the plurality of attendees.

7. The method of claim 1 wherein the executed computer-executable instructions perform the steps further comprising:

receiving fourth data from microsensors associated with movement of a plurality of attendees of the venue-centric event, and providing the fourth data to the first authenticated event application and the second authenticated event application.

8. The method of claim 7 wherein the microsensors are embedded in badges worn by the attendees.

9. The method of claim 1 wherein the executed computer-executable instructions perform the steps further comprising receiving a first key embedded in the set of first data items to confirm that the first authenticated event application is authenticated.

10. The method of claim 1 wherein the executed computer-executable instructions perform the steps further comprising analyzing the sets of first and second data items to optimize communicating the requested at least one second data item to the first authenticated event application.

11. The method of claim 1 wherein the first authenticated event application is associated with an agenda for the venue-centric event.

12. The method of claim 1 wherein the first authenticated event application is associated with a floorplan of a venue for the venue-centric event.

13. The method of claim 1 wherein the first authenticated event application is associated with registration of a plurality of attendees of the venue-centric event.

14. The method of claim 1 wherein the first authenticated event application is associated with connecting a first attendee with a second attendee based on a common interest.

15. A system configured for controlling access to data between a predetermined start time and a predetermined end time, the data associated with a venue-centric event, the system comprising:

a portable network appliance configured to route communications inside a venue hosting the venue-centric event by establishing a local wireless network, the portable network appliance connected to an internet;

a portable local appliance having one or more hardware processors, communications functionality, and non-transitory storage media storing machine-readable instructions that when executed by the one or more hardware processors cause the portable local appliance to perform steps comprising:

establish a connection to the local wireless network of the portable network appliance;

receive from a first remote server, over the internet, an encrypted set of first data items associated with a first authenticated event application and storing the encrypted set of first data items on the non-transitory storage media storing of the portable local appliance, the set of first data items subject to restricted access, wherein the first set of data items includes data items associated with audio-visual presentation software;

receive from a second remote server, over the internet, an encrypted set of second data items, at least some of the second data items being different from the first data items, the set of second data items being associated with a second authenticated event application and storing the encrypted set of second data items on the non-transitory storage media storing of the portable local appliance, the set of second data items subject to restricted access, wherein the second set of data items include data items associated with a vendor of the venue-centric event, the data items from the set of second data items that that are not included in the encrypted set of first data items comprising third data items;

receive and validate a request for at least one of the third data items from the first authenticated event application, the request being received via the local wireless network after the predetermined start time and before the predetermined end time; and communicate the requested at least one third data item to the first authenticated event application via the local wireless network, wherein the at least one third data item is encrypted during communication and wherein the executed machine-readable instructions perform the steps further comprising:

receiving fourth data items from mobile communications devices of a plurality of attendees of the venue-centric event and associated with registration information of the plurality of attendees; and providing the fourth data items to the first authenticated event application and the second authenticated event application.

16. The system of claim 15 wherein the executed machine-readable instructions perform steps further comprising encrypting the set of first data items and the set of second data items.

17. The system of claim 15, wherein the set of first data items are in a first format and the set of second data items are in a second format different from the first format.

18. The system of claim 17, wherein the first and second formats are each selected from the group consisting of JSON, XML, REST, SMTP, and IMAP.

19. The system of claim 15, wherein the request for at least one of the third data items originates with a mobile communications device associated with an attendee of the venue-centric event.

20. A non-transient computer-readable storage medium of a portable local appliance having instructions embodied thereon, the instructions being executable by one or more processors of the portable local appliance to perform a method for controlling access to data between a predetermined start time and a predetermined end time, the data associated with a venue-centric event, the method comprising:

establishing a local wireless network with a portable network appliance, the local wireless network configured to route communications between mobile communication devices associated with attendees of the venue-centric event and the portable local appliance;

receiving from a remote server, via an internet, an encrypted set of first data items, the encrypted set of first data items being associated with a first authenticated event application and storing the encrypted set of first data items on the portable local appliance, the encrypted set of first data items subject to restricted access, wherein the encrypted set of first data items include data items associated with a vendor of the venue-centric event;

receiving and validating a request for an encrypted set of second data items, at least some of the second data items being different from the first data items, the set of second data items being associated with a second authenticated event application, wherein the second authenticated event application is associated with audio-visual presentation software, the data items from the set of second data items that that are not included in the encrypted set of first data items comprising third data items;

receiving and validating a request for at least one of the third data items from the first authenticated event application, the request being received via the local wireless network after the predetermined start time and before the predetermined end time; and communicating the requested at least one third data item to the first authenticated event application via the local wireless network, wherein the at least one third data item is encrypted during communication; and wherein the executed machine-readable instructions perform the steps further comprising:

receiving via the local wireless network, fourth data items from mobile communications devices of a plurality of attendees of the venue-centric event and associated with registration information of the plurality of attendees; and providing, via the local wireless network, the fourth data items to the first authenticated event application and the second authenticated event application.

\* \* \* \* \*